United States Patent
Katsuragi et al.

(10) Patent No.: US 6,463,505 B2
(45) Date of Patent: *Oct. 8, 2002

(54) DISK ARRAY DEVICE WITH SELECTABLE METHOD FOR GENERATING REDUNDANT DATA

(75) Inventors: Eiju Katsuragi; Mikito Ogata; Akira Kurano, all of Odawara; Toshihiko Tamiya, Hadano; Akira Yamamoto, Sagamihara; Naoya Takahashi, Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/883,179

(22) Filed: Jun. 19, 2001

(65) Prior Publication Data

US 2001/0032294 A1 Oct. 18, 2001

Related U.S. Application Data

(63) Continuation of application No. 08/974,535, filed on Nov. 19, 1997, now Pat. No. 6,269,424.

(30) Foreign Application Priority Data

Nov. 21, 1996 (JP) ............................................. 8-310520

(51) Int. Cl.[7] ........................... G06F 12/16; G06F 11/10
(52) U.S. Cl. .............................. 711/114; 711/112; 714/6
(58) Field of Search ................................. 711/114, 155, 711/171, 112, 157, 161, 162; 714/6, 801, 779, 800, 763

(56) References Cited

U.S. PATENT DOCUMENTS

| 5,191,584 A | 3/1993 | Anderson ...................... 714/6 |
| 5,398,253 A | 3/1995 | Gordon ....................... 711/114 |
| 5,469,566 A | 11/1995 | Hohenstein et al. ............ 714/6 |
| 5,506,977 A | 4/1996 | Jones ......................... 711/155 |
| 5,613,088 A | 3/1997 | Achiwa et al. .............. 711/155 |

(List continued on next page.)

FOREIGN PATENT DOCUMENTS

JP  06-075709  3/1994

OTHER PUBLICATIONS

"A Case for Redunant Arays of Inexpensive Disks (RAID)," David A. Patterson, Garth Gibson, and Randy H. Katz, Report No. UCB/CSD 87/391, Dec. 1987, Computer Science Division (EECS), University of California, Berkley, California 94720.

*Primary Examiner*—Glenn Gossage
(74) *Attorney, Agent, or Firm*—Kenyon & Kenyon

(57) ABSTRACT

A disk array device selects a redundant generation method for reducing the overhead and improving the reliability associated with generating redundant data. The disk array device includes a disk controller connected to and controlling an array of disk drives. The disk controller includes a redundant data generator, a difference data generator, and a redundant data generation method selector. The redundant data generator is able to generate redundant data via a read and modify method and an all stripes method. The disk array device selects a method of generating redundant data from a method of read and modify and all stripes, and a method of generation in a drive and a method of difference, both of which are executed to generate redundant data on a disk drive. The disk array device selects the method of generating redundant data that will minimize the time required to process, transfer and store both the received host data and the generated redundant data based on the length of write data received from the host, an access pattern specified by the host, by the current load state of the disk drives, and by the existence of a failure state in a disk drive. Divided write data and previous data to be updated may be transferred depending on the write data length.

12 Claims, 10 Drawing Sheets

U.S. PATENT DOCUMENTS

| | | | |
|---|---|---|---|
| 5,734,812 A | 3/1998 | Yamamoto | 714/6 |
| 5,740,465 A | 4/1998 | Matsunami et al. | 711/114 |
| 5,742,752 A | 4/1998 | DeKoning | 714/6 |
| 5,761,402 A * | 6/1998 | Kaneda et al. | 714/6 |
| 5,826,002 A * | 10/1998 | Yamamoto et al. | 714/6 |
| 5,875,456 A | 2/1999 | Stallmo et al. | 711/114 |

* cited by examiner

DISK ARRAY DEVICE WITH SELECTABLE METHOD FOR GENERATING REDUNDANT DATA

CROSS-REFERENCE TO RELATED APPLICATIONS

This application is a Continuation of U.S. patent application Ser. No. 08/974,535, filed on Nov. 19, 1997, which issued as U.S. Pat. No. 6,269,424 on Jul. 31, 2001. This application is based on and claims priority of Japanese Patent Application No. 08-310520 filed on Nov. 21, 1996, the content of which is incorporated here in by reference.

FIELD OF THE INVENTION

The present invention relates to a technique for controlling a disk array, and more particularly to a technique for enhancing the efficiency and reliability of a process for generating and writing redundant data to a disk array storage devise.

BACKGROUND OF THE INVENTION

In 1987, David A. Patterson, et al. reported a technique for saving redundant data in storage devices. See David A. Patterson, "A Case for Redundant Arrays of Inexpensive Disks (RAID)," University of California at Berkeley, Computer Science Division Report UCB:CSD-87-391 (December 1987); see also David A. Patterson, "A Case for Redundant Arrays of Inexpensive Disks (RAID)," ACM SIGMOD conference proceeding, Chicago, Ill, Jun. 1–3, 1988, pp. 109–116. This technique is based on a generalized method of concatenating multiple physical storage devices into one logical storage unit. When a high level device (e.g., host computer or dedicated controller) writes user data to this type of logical storage unit, the data may be divided into a number of parts corresponding to the number of physical storage devices. At the same time, redundant data may also be generated and stored among the several physical storage devices. In the event that one of the physical storage devices fails, the stored redundant data can facilitate the discovery of stored user data. The Patterson document described the following two methods for generating redundant data.

The first method for generating redundant data, referred to herein as the "method of read and modify," generates redundant data from the combination of three sources: (1) write data from a high level device, (2) previous data stored in a storage device where the write data is to be stored, and (3) previous redundant data stored in a storage device where newly generated redundant data is to be stored.

Assuming that the write data is divided into $\alpha$ partitions, this method of generating redundant data requires $\alpha$ read operations to access previously stored data, $\alpha$ write operations to store the updated write data, one read operation to retrieve the previous redundant data, and one write operation to store the updated redundant data. To generate and store redundant data in this example, $(\alpha+1)$ read operations and $(\alpha+1)$ write operations are required, totaling $(2\alpha+2)$ input and output operations. If the use of redundant data is unnecessary, only $\alpha$ (write) operations would be required to store the data. This means that, using this method of generating redundant data, an additional $(\alpha+2)$ input and output operations are required.

The second method for generating redundant data, referred to herein as the "method of all stripes," generates redundant data from partitioned write data received from the high level device and from previous data read from the storage devices. In this method, however, the devices which store redundant data do not read previously-stored redundant data.

With this method, assume again that the write data is divided into $\alpha$ partitions Assume also that the number of storage devices, except those for saving redundant data, is $\beta$, and further that $\alpha<=\beta$. In this method, then, the total number of input operations to and output operations from the storage devices is $(\beta+1)$, wherein the number of input operations is $(\beta-\alpha)$ and the number of output operations, including those containing redundant data, is $\alpha+1$. If redundant data is not necessary, only $\alpha$ (write) operations would be required to store the data. This means that the additional number of input and output operations required is $(\beta+1-\alpha)$, when redundant data is generated by this second "method of all stripes."

Apart from the foregoing methods, a method for generating redundant data in storage devices has been disclosed in U.S. Pat. No. 5,613,088, wherein the storage device uses two heads for simultaneous reading and writing. Specifically, the read head and the write head are fixed on a common actuator. During the data update process, the read head reads existing parity data and then the write head follows, updating the same area with new parity data generated, in part, from the old parity data.

The foregoing two methods for generating redundant data, that is, the "method of read and modify" and the "method of all stripes," increase the number of input and output (I/O) operations associated with storing data on a disk. This means that the disk control device with redundancy is inferior in performance to the disk control device without redundancy. Hence, according to the present invention, a conventional disk control device with redundancy is made to selectively employ the redundant data generation method that results in a smaller number of I/O operations to and from the storage device. This selection makes it possible to reduce the burden on the storage device and thereby improve the processing speed. Specifically, in the case of $(\alpha>=(\beta-1)/2)$, the "method of all stripes" will use a smaller number of storage device I/O operations than the "method of read and modify," while in the case of $(\alpha<(\beta-1)/2)$, the "method of read and modify" will use a smaller number. Therefore, if the length of the write data received from the high level device is in the range of $(\alpha<(\beta-1)/2)$, for example, in the case of a short transaction process, a disk control device that is configured to use the present invention will select the "method of read and modify" to generate redundant data.

The number of I/O operations using the "method of read and modify" is minimized at four (4) when $\alpha=1$. This means that when $\alpha=1$, performance cannot be improved further unless the method of processing is reconsidered. The problem with the "method of read and modify" is essentially based on the fact that two I/O operations must be issued to the storage device for each partition of data. With each I/O operation there is significant overhead associated with such factors as movement of the head and rotational latency. This mechanical overhead is a great bottleneck on disk control devices.

The method disclosed in U.S. Pat. No. 5,613,088 makes it possible to generate redundant data in a storage device configured with a read head and a write head mounted on a single actuator. Expanding this method to a general storage device provided with a single read-write head, the resulting method, referred to herein as the method of "generation in a drive," employs the following steps. First, the data to be written to the disk drive device (the "write data") and the existing data that will eventually be updated with the "write data" (the "data before update") are transferred to the actual physical storage device that is responsible for generating and storing the redundant data. Within this redundant data physical storage device, the existing redundant data that will be updated (the "redundant data before update") is read, and the new redundant data is generated from the combination of the "write data," the "data before update," and the "redundant data before update." In this method of "generation in a drive," the head is positioned to read the "redundant data before update," and the updated redundant data is calculated, and when the disk reaches the next writing position, the write operation is started and the updated redundant data is stored. This operation makes it possible to avoid the spinning on standby that normally occurs during the interval between reading and writing, and merely requires one movement of the head and one standby spin. As a result, if the length of the data from the high level device is short, the processing speed of the control device can be improved further.

However, the method of "generation in a drive" cannot always calculate and store redundant data in the most efficient manner. If the length of the generated redundant data is longer than can be stored within one spin of the disk, the method of "generation in a drive" will require the disk ti spin on standby during the interval between reading the "redundant data before update" and writing the updated redundant data. This additional spinning on standby increases the time required by the drive to save the updated redundant data, and thereby increases the response time of the disk array device. Therefore, if the length of the redundant data is longer than can be stored within one spin of the disk, the method of "generation in a drive" will have a greater response time than if the redundant data could be stored within one spin of the disk.

The method of "generation in a drive" is designed to increase the volume of "data before update" read from the component disk drives, as the number of partitions of "write data" received from the high level device increases, thereby increasing the load placed on the data storage device. Hence, if the number of partitions of "write data" is great, the method of "generation in a drive" disadvantageously lowers the throughput of the disk array device.

With the method of "generation in a drive," it is possible to increase the amount of time the redundant data disk drive is busy during each spin of the disk, as compared to the "method of read and modify." This increases the burden placed on the redundant data disk drive in a highly multiplexed and high load environment. Hence, the method of "generation in a drive" may enhance the probability that the redundant data disk drive will be in use, thereby lowering the throughput of the drive.

When write data is transferred from the high level device to the disk control device, together with an explicit specification of consecutive pieces of data, the method of "generation in a drive" operates to immediately generate redundant data for the transferred write data. As a result, when the succeeding write data is transferred from the high level device, the "method of all stripes" may lose the chance of generating redundant data corresponding to the first write data. Hence, if the method of "generation in a drive" cannot use the "method of all stripes," this disadvantageously lowers the efficiency of generating redundant data, thereby degrading the throughput of the disk array device.

Finally, with the method of "generation in a drive," the generation of redundant data may become unsuccessful upon the occurrence of any drive-related failure, such as the inability to read the "redundant data before update." If this kind of failure occurs, the redundancy of the Error Correcting Code (ECC) group of the component disk drives of the disk array device may be lost at once.

SUMMARY OF THE INVENTION

It is an object of the present invention to avoid the spinning on standby that occurs when the data length of the write data from a high level device is longer than can be stored within one spin of the disk, and to improve the response time of a disk array device when it generates and stores redundant data.

It is a further object of the present invention to improve the throughput of a disk array device by selecting the most appropriate method for generating redundant data, so that the necessary number of reads of the "data before update" is minimized relative to the number partitions of write data received from the high level device.

It is yet a further object of the present invention to reduce the amount of time the redundant data disk drive is busy during each spin of the disk.

It is another object of the present invention to improve the throughput of a disk array device by enhancing the efficiency of generating redundant data in association with the required access pattern (e.g., sequential access, indexed access, etc.) for the write data, as specified by the high level device.

It is still another object of the present invention to enhance the reliability of the process of generating redundant data in disk array storage devices.

According to the invention, a disk array device having a plurality of disk drives composing a disk array, and a disk control device for controlling those disk drives includes a plurality of methods for generating redundant data and a control logic for selectively executing at least one of those methods when a high level device requests the disk array device to store supplied data in a redundant fashion.

The disk array device, including a plurality of disk drives composing a disk array and a disk control device for controlling those disk drives, is dynamically switched from the generation of redundant data in the disk control device to the generation of the redundant data inside of the disk drives according to an operating status.

Specifically, as an example, the disk array device according to the invention includes the following components.

That is, the disk array device composing a plurality of disk drivers, which is arranged to set a logic group of a partial set of the disk drives and save the redundant data in part of that logic group for the purpose of recovering fault data from the normal disk drives when some of the disk drives are disabled by temporary or permanent failure, provides methods for generating redundant data in each of the disk drives.

The disk control device contains: (1) a first redundant data generating circuit that generates new redundant data from partitioned write data received from a high level device, the previous data to be updated by the partitioned write data, and the redundant data of the data group of the partitioned write data, (2) a second redundant data generating circuit that generates new redundant data of the data group from the data that is not updated by the partitioned write data contained in the data group, and (3) a selective control circuit for selecting a difference data generating circuit for generating difference data from: (a) the partitioned write data received from the high level device and (b) the previous data updated by the partitioned write data and one of the redundant data generating circuits.

Further, the disk control device provides a method of determining the length of the write data received from the high level device, a method of detecting the utilization of each redundant data disk drive, a method of determining if the transfer of consecutive pieces of data from the high level device has been explicitly specified, and a method of detecting if the generation of redundant data within the redundant data disk drive has failed. The selective control circuit operates to select a proper method for generating the redundant data.

An example of a preferred embodiment of the disk array device and the method for controlling the disk array device as described above is provided as follows.

The disk array device operates to determine the length of the write data sent from the high level device, and then generate redundant data in the redundant data disk drive if the data length is determined to be shorter than can be stored within one spin of the disk. Hence, the disk array device operates to suppress the spinning on standby within the redundant data disk drive, thereby improving the throughput of the disk array device.

If the length of the write data sent from the high level device is determined to be longer than can be stored within one spin of the disk, the difference data between the partitioned write data and the "data before update" stored on the raw data disk drive(s) is transferred onto the redundant data disk drive. The redundant data disk drive then operates to generate redundant data from the difference data and the "redundant data before update," thereby suppressing the spinning on standby within the redundant data disk drive and improving the throughput of the disk array device accordingly.

The method for controlling the disk array device is executed to determine the utilization of the redundant data disk drive, generate the redundant data in another disk control device without having to execute the method of "generation in a drive" if the utilization is determined to be greater than or equal to a given value, for the purpose of distributing the load associated with generation of the redundant data. In a highly multiplexed and high load environment, by suppressing the increase of the load placed on the redundant data disk drive, it is possible to lower the probability that the redundant data disk drive will be in use and thereby improve the throughput of the disk array device.

The method for controlling the disk array device is executed to determine if the transfer of consecutive pieces of data from the high level device to the disk control device has been explicitly specified and to generate redundant data in the short time after the write data reaches a sufficient length without immediately generating the redundant data, if the explicit transfer of consecutive data is specified. This enables an improved efficiency of generating redundant data and improves the throughput of the disk array device.

When the method of "generation in a drive" fails to generate redundant data, the method for generating the redundant data is switched to another method. This makes it possible to increase the chances of recovering from the failure and thereby improving the reliability of the disk array device.

DESCRIPTION OF THE PREFERRED EMBODIMENTS

Hereafter, an embodiment of the invention will be described in detail with reference to the appended drawings.

Figure 1:
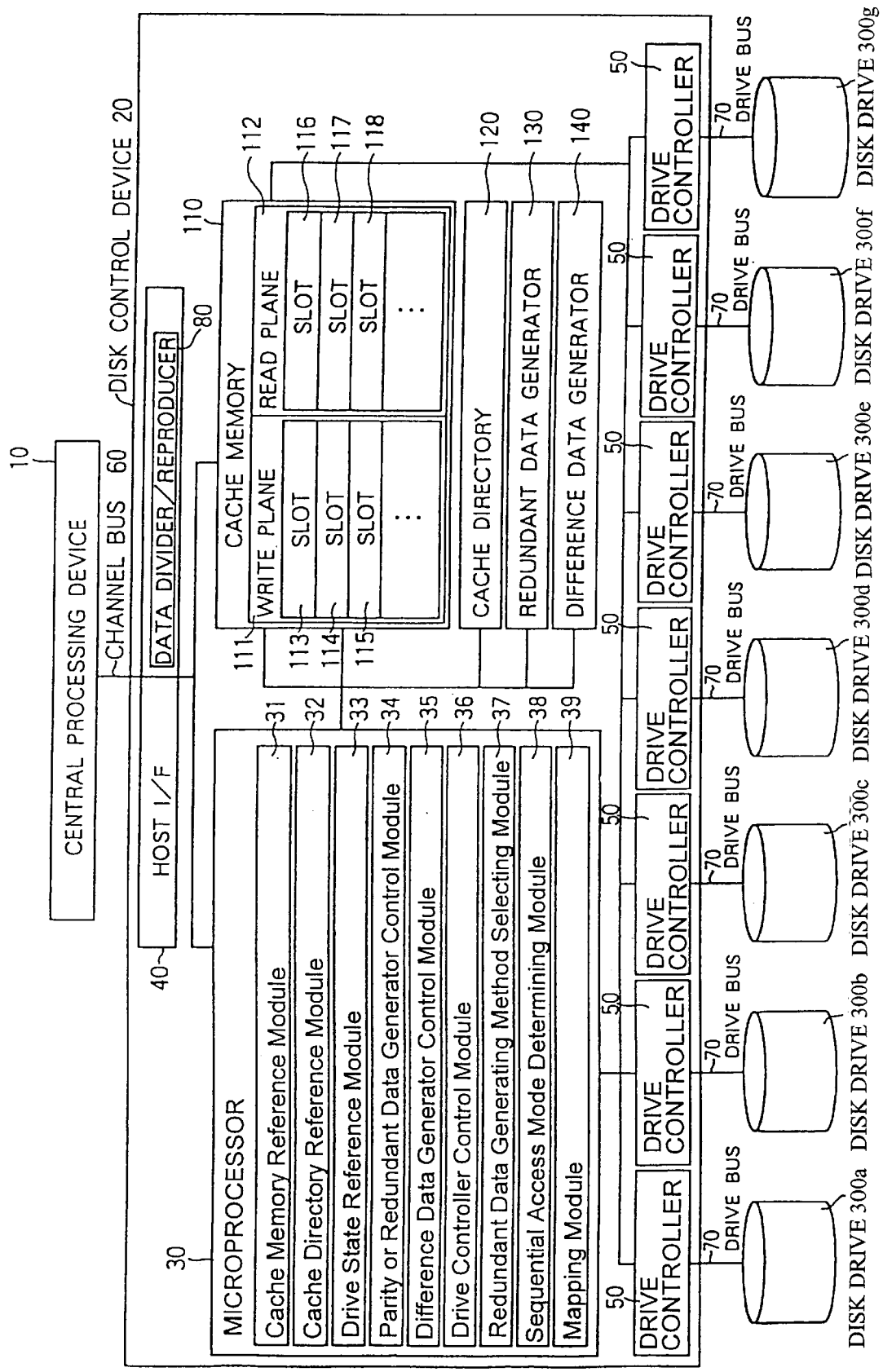
FIG. 1 is a diagram showing an arrangement of an information processing system including a disk array device according to an embodiment of the present invention.

FIG. 1 is a diagram showing an arrangement of an information processing system including a disk array device according to an embodiment of the present invention. The information processing system according to this embodiment is arranged to have a central processing device 10 (also referred to herein as a host 10 or a high level device 10) and a disk array device connected thereto. The disk array device is configured with a disk control device 20 and seven disk drives 300 (300*a* to 300*g*) to be operated independently of each other, each of which disk drives may be a magnetic disk unit, for example. These seven disk drives 300 together compose an Error Correcting Code (ECC) group, with which user data can be recovered when a failure occurs. The host 10 is coupled to the disk control device 20 through a channel bus 60. The disk control device 20 is connected to each disk drive 300 through the corresponding drive bus 70 so that each disk drive 300 may be operated independently of each other.

The disk control device 20 is arranged to have a host interface (host I/F) 40, a data divider/reproducer 80, a microprocessor 30, a cache memory 110, a cache directory 120, a redundant data generator 130, a difference data generator 140, and a plurality of drive controllers 50. The host I/F 40 and the data divider/reproducer 80 are each coupled to a channel bus 60, to the cache memory 110, and to the microprocessor 30 through signal lines. The microprocessor 30 is coupled to the cache memory 110, the cache directory 120, the redundant data generator 130, the difference data generator 140, and the plurality of drive controllers 50 through signal lines. The cache memory 110, the cache directory 120, the redundant data generator 130, the difference data generator 140, and the plurality of drive controllers 50 are controlled by: a cache memory reference module 31, a cache directory reference module 32, a drive state reference module 33, a redundant data generator control module 34, a difference data generator control module 35, and a drive controller control module 36, all of which are microprograms that are executed by the microprocessor 30.

The microprocessor 30 also includes a redundant data generating method selecting module 37 serving as a means for determining the method for generating the redundant data, a sequential access mode determining module 38 serving as a means for checking if the sequential access from the host 10 is specified, and a mapping module 39 serving as a means for calculating a write position on the actual disk drive 300 from the write data from the host 10. These modules are microprograms that are executed by the microprocessor 30.

The cache memory 110, the cache directory 120, the redundant data generator 130, and the difference data generator 140 are coupled together through signal lines. The cache memory 110 is coupled to the plurality of drive controllers 50 through a signal line that allows data to be transferred between the cache memory 110 and the plurality of drive controllers 50. The cache memory 110 is divided into a write plane 111 on which the write data from the host 10 is saved and a read plane 112 on which the data read from the disk drive 300 is saved. The write plane 111 and the read plane 112 are each divided into a plurality of partitions, identified by slots 113 to 115 and slots 116 to 118, respectively.

Figure 10:
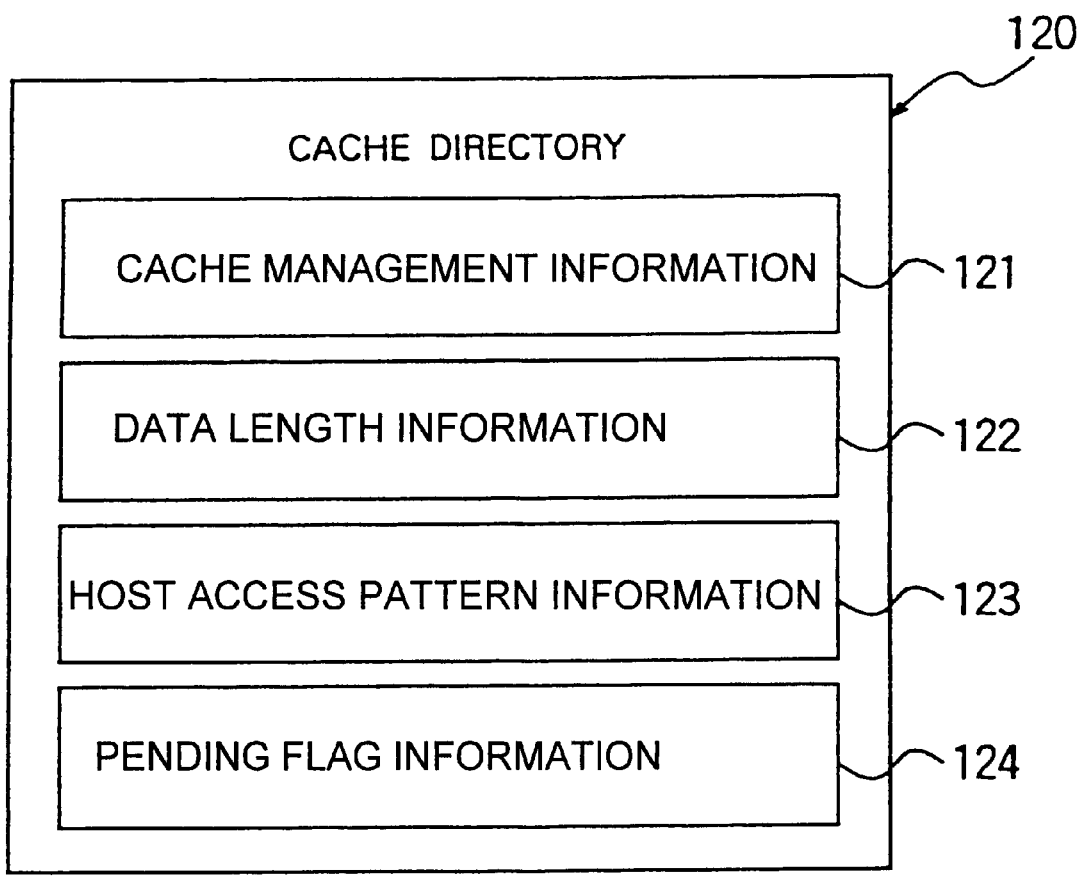
FIG. 10 is a view of an arrangement of a cache directory in the disk control device included in the disk array device according to an embodiment of the present invention.

FIG. 10 is an illustration of an arrangement of a cache directory 120 according to an embodiment of the present invention. In this embodiment, the cache directory 120 contains several categories of information. Those categories include: cache management information 121 for managing data in the cache memory 110, data length information 122 for representing the quantity of data received from the host 10, host access pattern information 123 for specifying the pattern used by the host 10 to access the data (such as random access or sequential access), and pending flag information 124 for indicating when a particular data write process is pending or has been completed (for example, to indicate that a sequential access operation is still underway).

Figure 2:
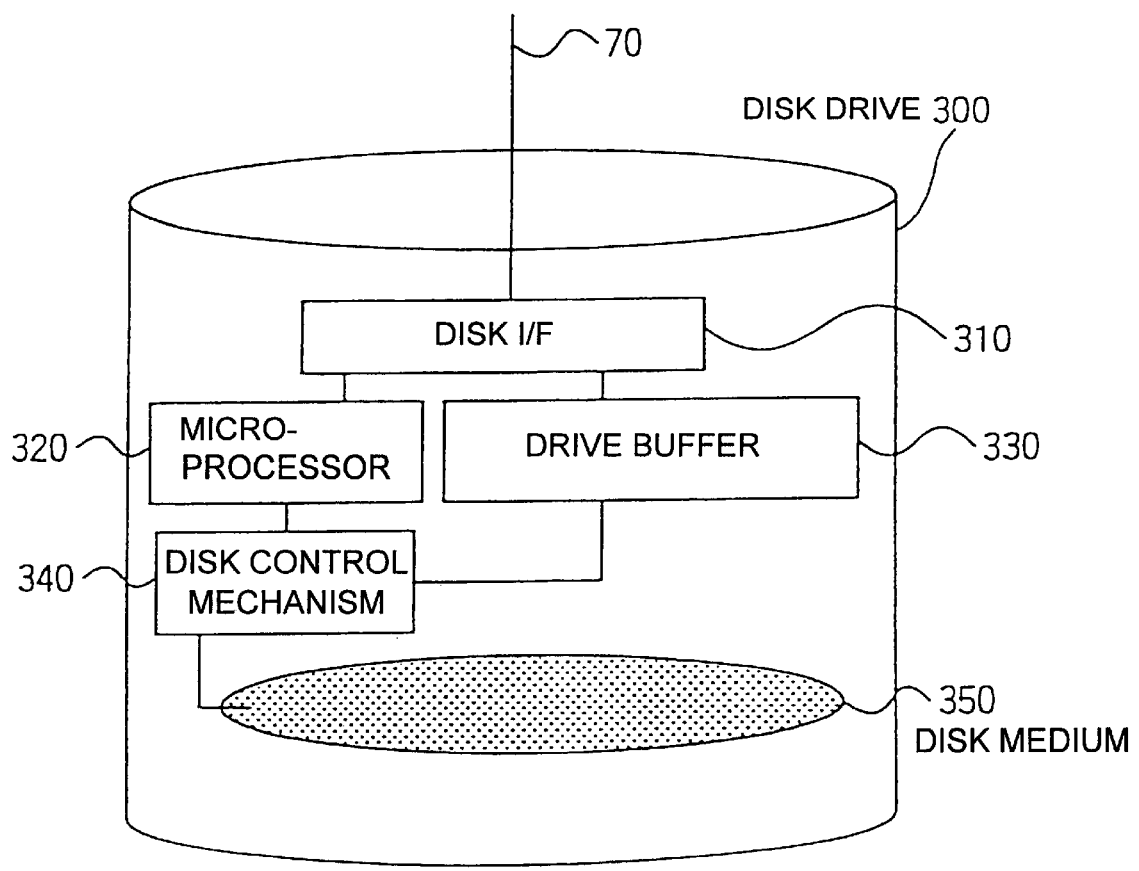
FIG. 2 is a view of an internal arrangement of a disk drive used in the disk array device according to an embodiment of the present invention.

FIG. 2 is an illustration of an internal arrangement of the disk drive used in an embodiment of the present invention. The disk drive 300 includes: a disk interface (disk I/F) 310 for controlling the transfer of information between the disk drive 300 and a drive controller 50 via the drive bus 70, a drive buffer 330 for temporarily holding data received from an external drive controller 50 and data read from an internal disk medium 350, and a disk control mechanism 340 for controlling the position of a disk head (not shown) with respect to the disk medium 350. The disk I/F 310, the drive buffer 330 and the disk control mechanism 340 are coupled to the microprocessor 320 through signal lines. The activities of the disk I/F 310, the drive buffer 330 and the disk control mechanism 340 are coordinated and controlled by the microprocessor 320.

In this embodiment, the microprocessor 320 of each disk drive 300 is capable of performing at least the following three (3) functions under direction of a drive controller 50:
(1) generating redundant data from newly received user data, (2) generating redundant data from the combination of newly received user data and data that has already been stored on the disk medium 350, and (3) saving new redundant data on the disk medium 350 of the disk drive 300.

Figure 3:
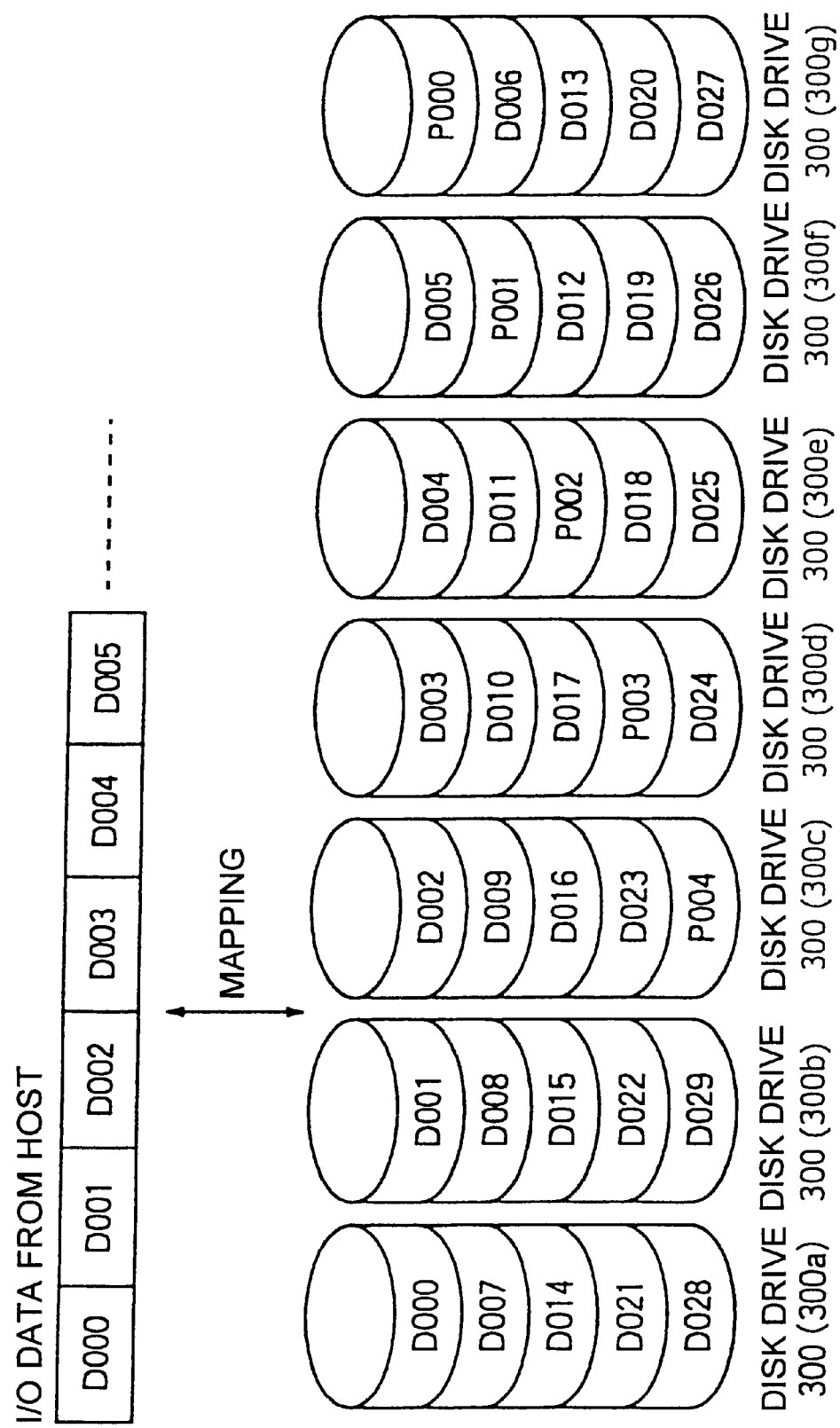
FIG. 3 is a view of an example of mapping data to be given to and received from a high level device by the disk drive used in the disk array device according to an embodiment of the present invention.

FIG. 3 is an illustration of how input/output (I/O) data can be mapped between the host 10 and the disk medium 350, according to a preferred embodiment of the present invention. In this embodiment, the data recording area of the disk medium 350 of each disk drive 300 is logically divided into a plurality of unit areas. When a unit area from disk drive 300a is concatenated with a corresponding unit area from disk drive 300b and with corresponding unit areas from disk drives 300c to 300g, the resulting collection of data comprises an ECC data group, which contains at least one piece of redundant data.

Referring to FIG. 3, a stream of data units D000, D001 D002, . . . , D029 is received from host 10. Data units are processed in sequence, in groups corresponding in number to one less than the number of available disk drives (in this example, six data units would be processed together, since there are seven disk drives, 300a–300g). For each of these groups of data units, redundant data is calculated. For example, in FIG. 3, redundant data P000 has been calculated for the group of data units D000 to D005. After the redundant data has been calculated, the data units together with their redundant data are each mapped to one of the available disk drives 300 in the ECC data group.

In FIG. 3, redundant data P000 has been mapped to disk drive 300g, and data units D000 to D005 have been mapped to disk drive 300a to 300f, respectively. This mapping of data (the collection of data units plus their corresponding redundant data) to the individual disk unit areas in the ECC data group, follows an ordering, which guarantees that redundant data units are distributed evenly across all available disk drives 300 in the ECC data group. The ordering begins with the right-most or upper-most disk drive 300g in FIG. 3 and cycles continuously through all available disk drives 300 in reverse order. In FIG. 3, this ordering can be observed by noting that redundant data P000 has been mapped to disk drive 300g, redundant data P001 has been mapped to disk drive 300f, P002 has been mapped to disk drive 300e, P003 has been mapped to disk drive 300d, and P004 has been mapped to disk drive 300c. After each redundant data unit has been mapped to a disk drive 300, its corresponding data units are then sequentially mapped to disk drives 300 in forward sequential order. Thus, in FIG. 3, after P000 has been mapped to disk drive 300g, data units D000 to D005 are then mapped to disk drives 300a to 300f, respectively (note that disk drive 300a sequentially follows disk drive 300g in the sequential mapping order). Similarly, after P001 has been mapped to disk drive 300f, data units D006 to D011 are then mapped to disk drives 300g and 300a to 300e, respectively (again note that, cycling in forward order, disk drive 300a sequentially follows disk drive 300g).

If the redundant data in FIG. 3 is calculated to be the exclusive OR of its corresponding data units, then if a failure occurs in one disk drive 300, the fault can be recovered by calculating the exclusive OR of the data retrieved from the remaining operational disk drives 300.

It can be appreciated that the redundant data is not limited to a simple exclusive OR calculation. Any one of a number of error correcting code techniques may be used, including a Hamming code.

Figure 4:
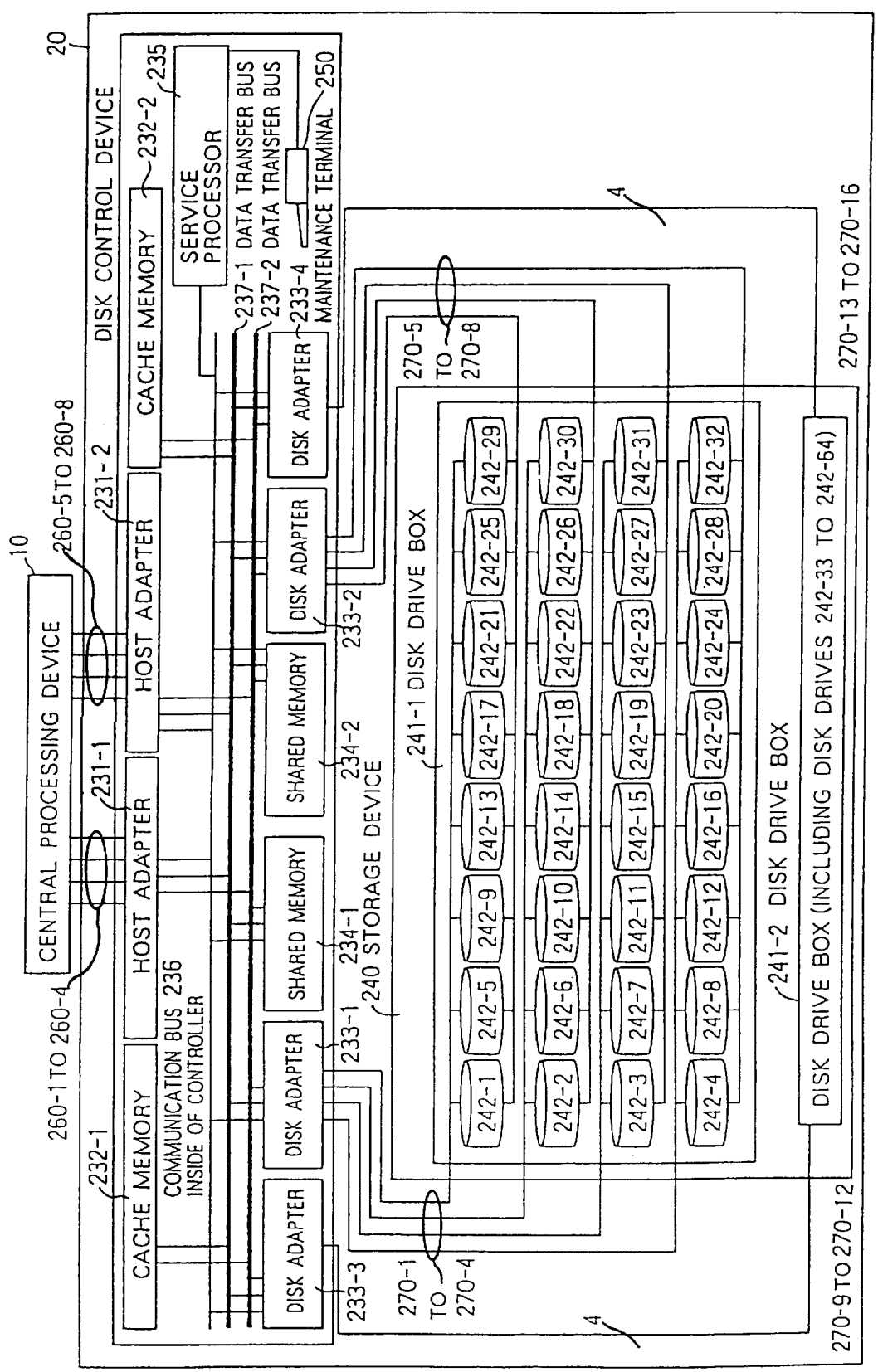
FIG. 4 is a diagram showing an arrangement of hardware of an information processing system including a disk array device according to an embodiment of the present invention.

Refer now to FIG. 4, showing a diagram of the disk array device according to a preferred embodiment of the present invention. The channel bus 60 shown in FIG. 1 corresponds to 260-1 through 260-8. The host I/F 40 and the data divider/reproducer 80 shown in FIG. 1 correspond to host adapters 231-1 and 231-2, respectively. The microprocessor 30, the plurality of drive controllers 50, the redundant data generator 130, and the difference data generator 140 shown in FIG. 1 correspond to disk adapters 233-1 through 233-4, respectively. The cache memory 110 shown in FIG. 1 corresponds to cache memories 232-1 to 232-2. The cache directory 120 shown in FIG. 1 corresponds to shared memories 234-1 to 234-2. The drive bus 70 shown in FIG. 1 corresponds to 270-1 to 270-16.

The host adapters 231-1 to 231-2, the cache memories 232-1 to 232-2, the disk adapters 233-1 to 233-4, and the shared memories 234-1 to 234-2 are connected to each other through double-width data transfer buses 237-1 to 237-2.

Under the control of disk control device 20, storage device 240 contains disk drive boxes 241-1 to 241-2, which in turn house disk drives 242-1 to 242-32 and disk drives 242-33 to 242-64, respectively.

The host adapters 231-1 to 232-2, the disk adapters 233-1 to 233-4, and the shared memories 234-1 to 234-2 are connected to a service processor 235 through a communication path 236 inside a control unit. The service processor 235 may be accessed by an operator through maintenance terminal 250.

FIG. 1 illustrates a single ECC group of disk drives, while FIG. 4 illustrates a total of eight ECC groups of disk drives. The disk drives 242-1 to 242-7, 242-9 to 242-15, 242-17 to 241-23, and 242-25 to 242-31 each correspond to ECC groups. The disk drives 242-8, 242-16, 242-24 and 242-32 are spared disk drives. Disk drives 242-33 to 242-64 are configured in the same manner as disk drives 242-1 to 242-32.

Figure 5:
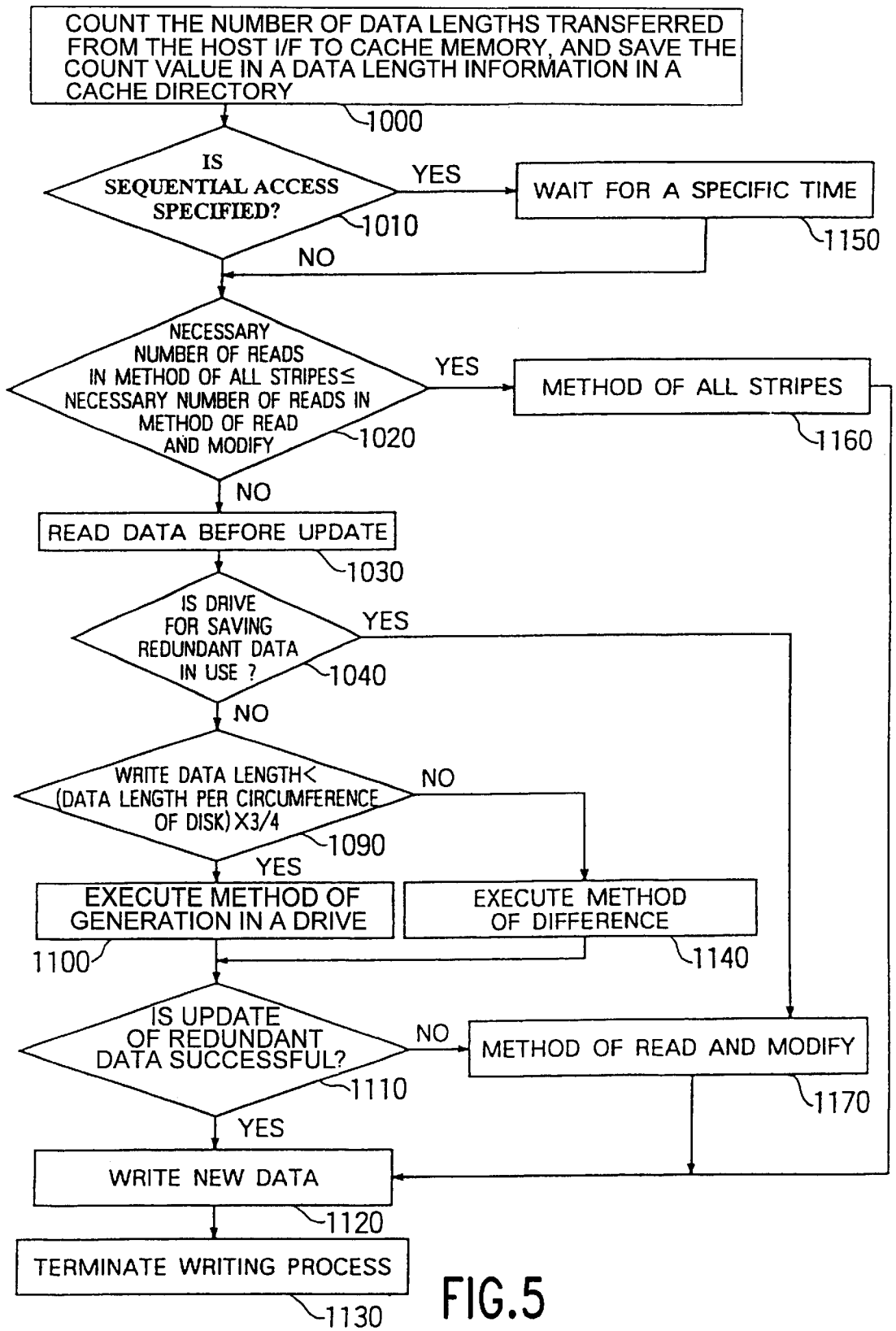
FIG. 5 is a flowchart showing an example of a process for selecting a method for generating redundant data in a disk array device according to an embodiment of the present invention.

FIG. 5 is a control flow diagram, illustrating the operation of the microprocessor 30 (in FIG. 1) when the central processing device 10 (host 10) supplies data to be written ("write data") to the disk array device. The "write data" from the host 10 is transferred to the disk control device 20 through the channel bus 60 and is divided into partitions by the data divider/reproducer 80 shown in FIG. 1. At step 1000 of FIG. 5, the host I/F 40 saves each partition in one slot of the write plane 111 of the cache memory 110, as the microprocessor 30 counts the number of partitions saved. This partition count value is then stored in the data length information 122 included in the cache directory 120 (FIG. 10). In step 1010, the sequential access mode determining module 38 is executed to determine if the host access pattern supplied by the host 10 indicates the data is to be stored and/or accessed sequentially. The result of this test is saved in the host access pattern information 123 of the cache directory 120 (FIG. 10).

If sequential access has been specified by the host 10, step 1150 is executed. The pending flag information 124 on cache directory 120 is first modified to reflect the fact that the sequential access operation is underway. Then, the host 10 is informed that the writing process has completed, and the microprocessor 30 is made to wait for a specified time, even though at this point in the process, no redundant data has been generated, and no write data has actually been written to the disk drive 300. This waiting behavior is important because it is highly probable that subsequent write data requests received from the host 10 will also specify sequential access. If the "method of all stripes" is being used to generate redundant data, this waiting will allow the microprocessor 30 to fill all of the write plane slots corresponding to one disk stripe (a disk stripe is a set of write plane slots that are individually written on the same position of different physical disk drives), if additional write data arrives before the waiting time has expired. The proper waiting time is calculated by ((data length of the stripe—transferred data length)/data transfer speed from the host). If additional write data has not been received after the microprocessor 30 has waited for the specified time, the operation continues on to step 1020.

If sequential access is not specified by the host at the step 1010, or if the operation at step 1050 timed out, the operation at the step 1020 is executed. First, the microprocessor 30 invokes mapping module 39 (FIG. 1) to calculate the specific column on disk drive 300 where the write data of each slot is to be saved to disk medium 350. Next, the microprocessor 30 calculates two values: (1) the number of read operations required if the "method of read and modify" is used, and (2) the number of read operations required if the "method of all stripes" is used.

The microprocessor 30 determines the number of read operations for the "method of read and modify" by executing the redundant data generating method selecting module 37 to calculate and return a value corresponding to the number of slots that contain write data plus one. The microprocessor 30 then determines the number of read operations for the "method of all stripes" by executing the redundant data generating method selecting module 37 to calculate and return a value corresponding to the number of disk drives 300 required to save the write data subtracted from the available number of disk drives 300. Finally, the redundant data generating method selecting module 37 is executed again to compare the necessary number of reads in the "method of all stripes" with the necessary number of reads in the "method of read and modify," as shown in step 1020. If the conditional expression:

(the necessary number of reads in the "method of all stripes")<= (the necessary number of reads in the "method of read and modify") (expression 1)

is met, the "method of all stripes" is selected and the operation goes to step 1160.

Figure 6:
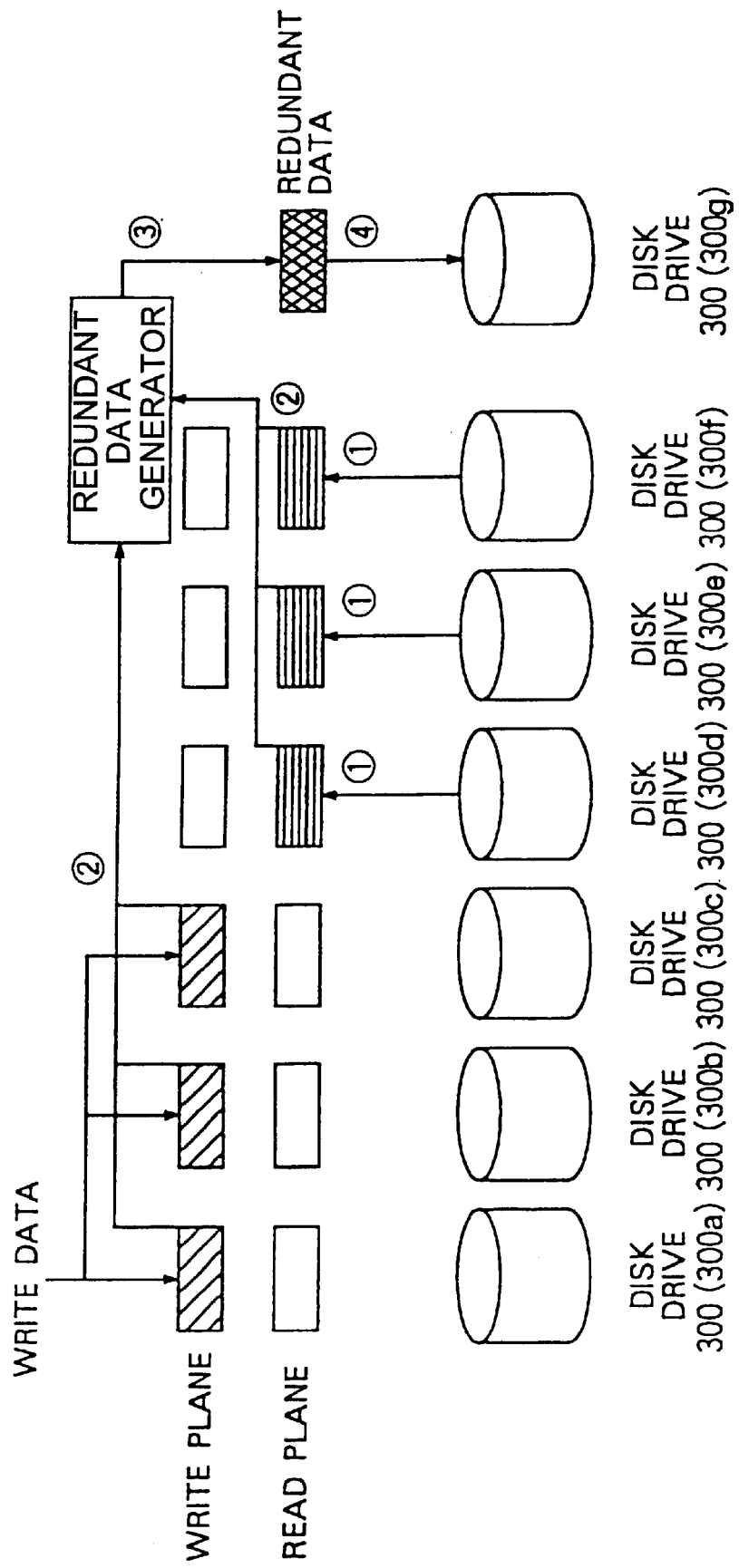
FIG. 6 is a diagram showing the flow of data during the generation of redundant data according to the "method of all stripes" in the disk array device according to an embodiment of the present invention.

In step 1060, the "method of all stripes" is employed to write a stream of data, as shown in FIG. 6. At first, a read request is issued to each of the disk drives 300 (300d to 300f) which will remain unaffected by the write process. Then, as indicated by operation (1) in FIG. 6., the data on the unaffected disk drives 300 (300d to 300f) are read by the read plane 112 of the cache memory 110 (see FIG. 1). In operation (2) of FIG. 6, the data to be written, which has been saved on the slots in write plane 111 corresponding to disk drives 300 (300a to 300c), together with the data now on the read plane 112, are transferred to the redundant data generator 130 (see FIG. 1). The redundant data generator 130 operates to generate the redundant data and then, in operation (3) of FIG. 6, the redundant data generator 130 saves the redundant data in the read plane 112 of the cache memory 110. Finally, the drive controller control module 36 (see FIG. 1) utilizes the drive controller 50 so that the redundant data on the read plane 112 of the cache memory 110 is transferred to the disk drive 300 (300g) and stored in operation (4) of FIG. 6.

In step 1020, if expression 1 is not satisfied, the operation goes to step 1030 (FIG. 5). As shown in (1) of FIG. 7 or 8, a read request is issued to the disk drives 300 (300a to 300b). The data on those disk drives 300 (300a to 300b) are transferred to the read plane 112 of the cache memory 110 (see FIG. 1). Then, the operation goes to step 1040. The drive state reference module 33 is executed to determine if the redundant data disk drive 300 (300g) is in use. If it is in use, the operation goes to step 1170.

If the redundant data disk drive 300 (300g) is not in use, the operation goes to step 1090. The redundant data generating method selecting module 37 is executed to derive a cylinder number (#) on the disk medium 350 (see FIG. 2) from the position on the disk medium 350 where the redundant data is to be saved, and calculate a data length at each turn of the cylinder # (track). In the case of a constant density recording whose information recording capacity per cylinder of an inner circumference is different from that of an outer circumference, the data length for one circumference can be easily obtained since the data length is a function of the cylinder #. In addition, if the information recording capacity per cylinder of the inner circumference is equal to that of the outer circumference, this calculation is not necessary. The data length per circumference in any cylinder can be immediately obtained from the device specification of the disk drive 300.

In step 1090, the microprocessor 30 operates to compare the data length per circumference with the data length of the write data saved in the cache directory 120 and to determine if spinning on standby should take place. In actuality, there is some overhead involved when the microprocessor 30 (see FIG. 1) calculates redundant data. Assume that the duration of this overhead is some fraction (1/n) of one spin of the disk medium 350. (At step 1090 shown in FIG. 5, it is assumed for purposes of illustration that the overhead associated with redundant data calculation is ¼ of one spin of the disk medium 350.) Since the write data length is required to be within one spin time of the disk medium 350, including overhead calculations, the condition for comparison is:

Write Data Length<(Data Length per circumference of Disk Medium)×(1−1/n)     (expression 2)

When this condition is met, the operation goes to a step 1100 where redundant data is generated using the method of "generation in a drive." Otherwise, step 1140 is executed.

Figure 7:
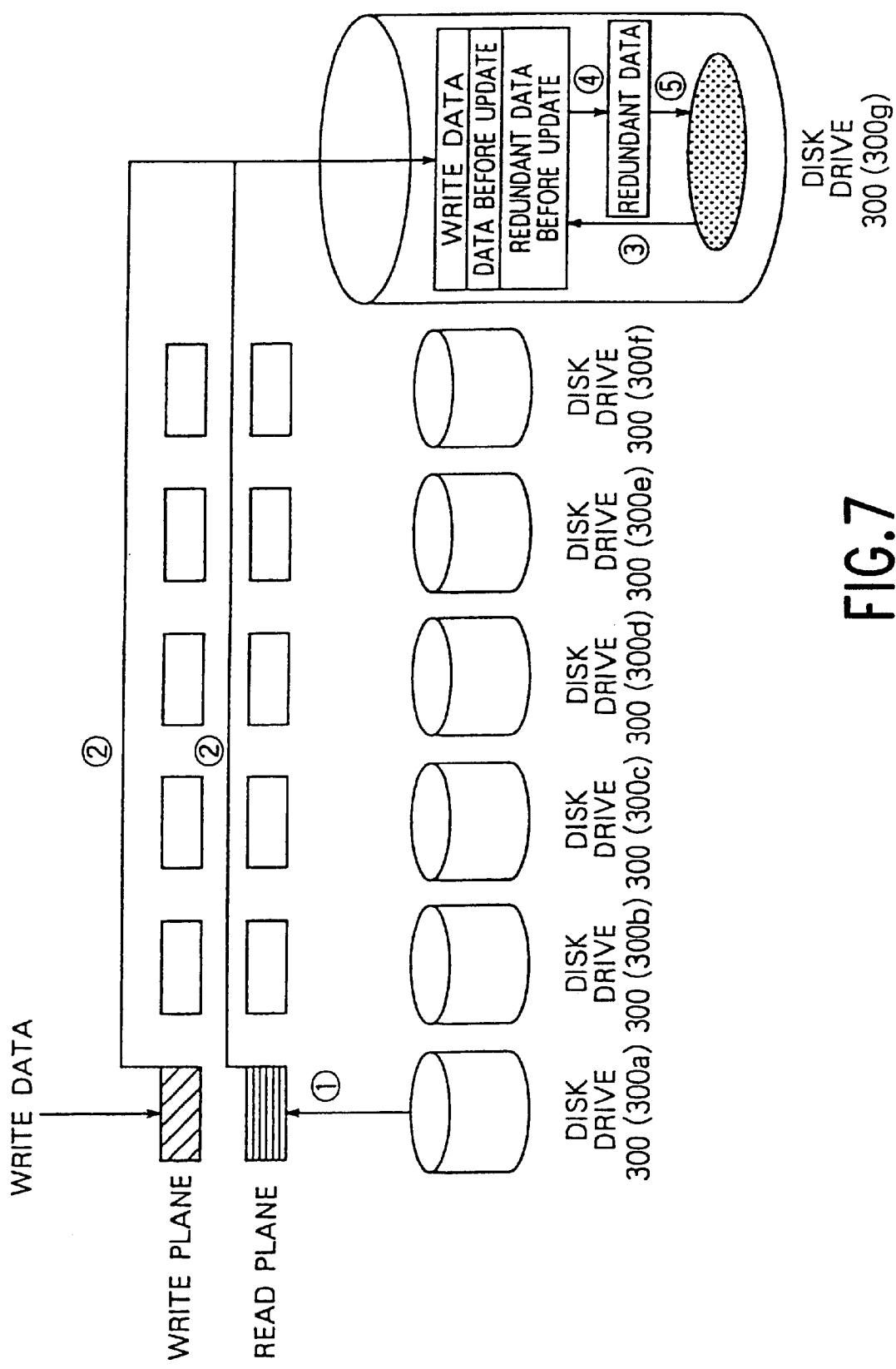
FIG. 7 is a diagram showing the flow of data during the generation of redundant data according to the method of "generation in a drive" in the disk array device according to an embodiment of the present invention.

The operation at step 1100 is executed as shown in FIG. 7. The write data on the write plane 111 (FIG. 1) and the data before update on the read plane 112 (FIG. 1) are transferred to the disk drive 300 (300g) (see (2) of FIG. 7). The write data transferred from the disk control device 20 (FIG. 1) and the data before update are transferred to a drive buffer 330 through a disk I/F 310 (FIG. 2). At the same time, the microprocessor 320 located inside of the disk drive 300 operates to position the head at the position where the "redundant data before update" is saved through the disk control mechanism 340. On the termination of the positioning operation, the "redundant data before update" is read into the drive buffer 330 (see (3) of FIG. 7). The exclusive OR of the "redundant data before update" to be read, the write data having been stored in the buffer, and the data before update is calculated by the microprocessor 320 for generating the new redundant data and storing it in the drive buffer 330 (see (4) of FIG. 7). Thereafter, when the disk medium 350 is spun once and reaches the positioning point, the microprocessor 320 operates to write the redundant data on the drive buffer 330 (see (5) of FIG. 7). The disk drive 300 reports a success or failure of the generation and write of the redundant data to the disk control device 20.

After successfully writing the redundant data, the operation goes to the next step 1110. The microprocessor 30 operates to detect if the redundant data update operation at step 1100 has succeeded or failed. If successful, the operation goes to a step 1120. If the redundant data update operation failed, the operation goes to a step 1170. At this step, which is used when the redundant data is in use (determined at step 1040 shown in FIG. 5) or when the redundant data update operation has failed, the redundant data generating method selecting module 37 is executed to select the "method of read and modify."

Figure 8:
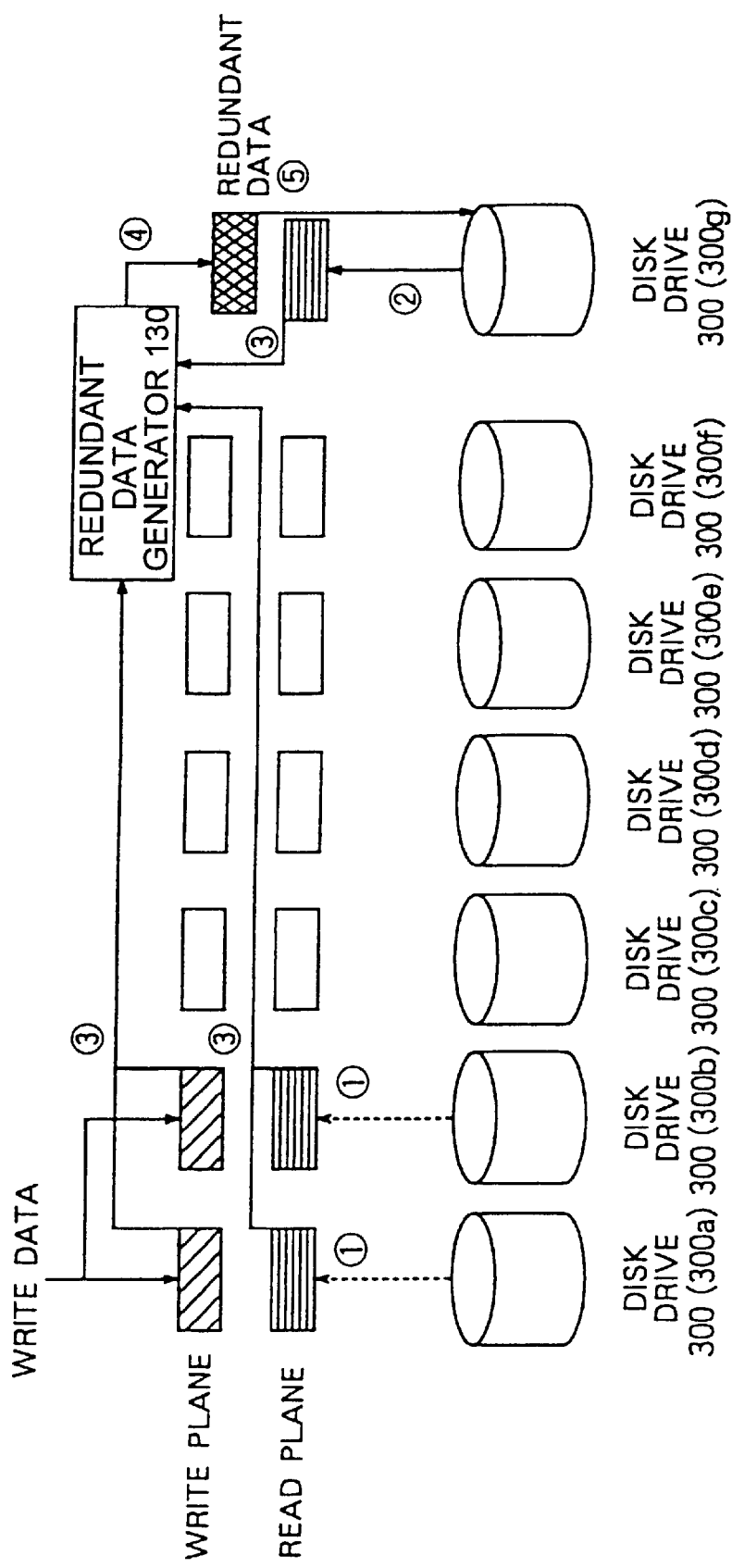
FIG. 8 is a diagram showing the flow of data during the generation of redundant data according to the "method of read and modify" in the disk array device according to an embodiment of the present invention.

The "method of read and modify" (step 1170 shown in FIG. 5) is executed as shown in FIG. 8. At this point, since the data before update has been read into the read plane 112 of the cache memory 110 (see FIG. 1), only the "redundant data before update" on the disk drive 300 (300g) is read onto the read plane 112 of the cache memory 110 at operation (2) of FIG. 8. Then, the write data, the data before update, and the "redundant data before update" are transferred into the redundant data generator 130, at operation (3) of FIG. 8, for generating the redundant data from those pieces of data. At operation (4), The generated redundant data is then saved on the write plane 111 of the cache memory 110. Finally, the generated redundant data is written to the disk drive 300 (300g) at step 1120 and the writing process is terminated at step 1130.

Figure 9:
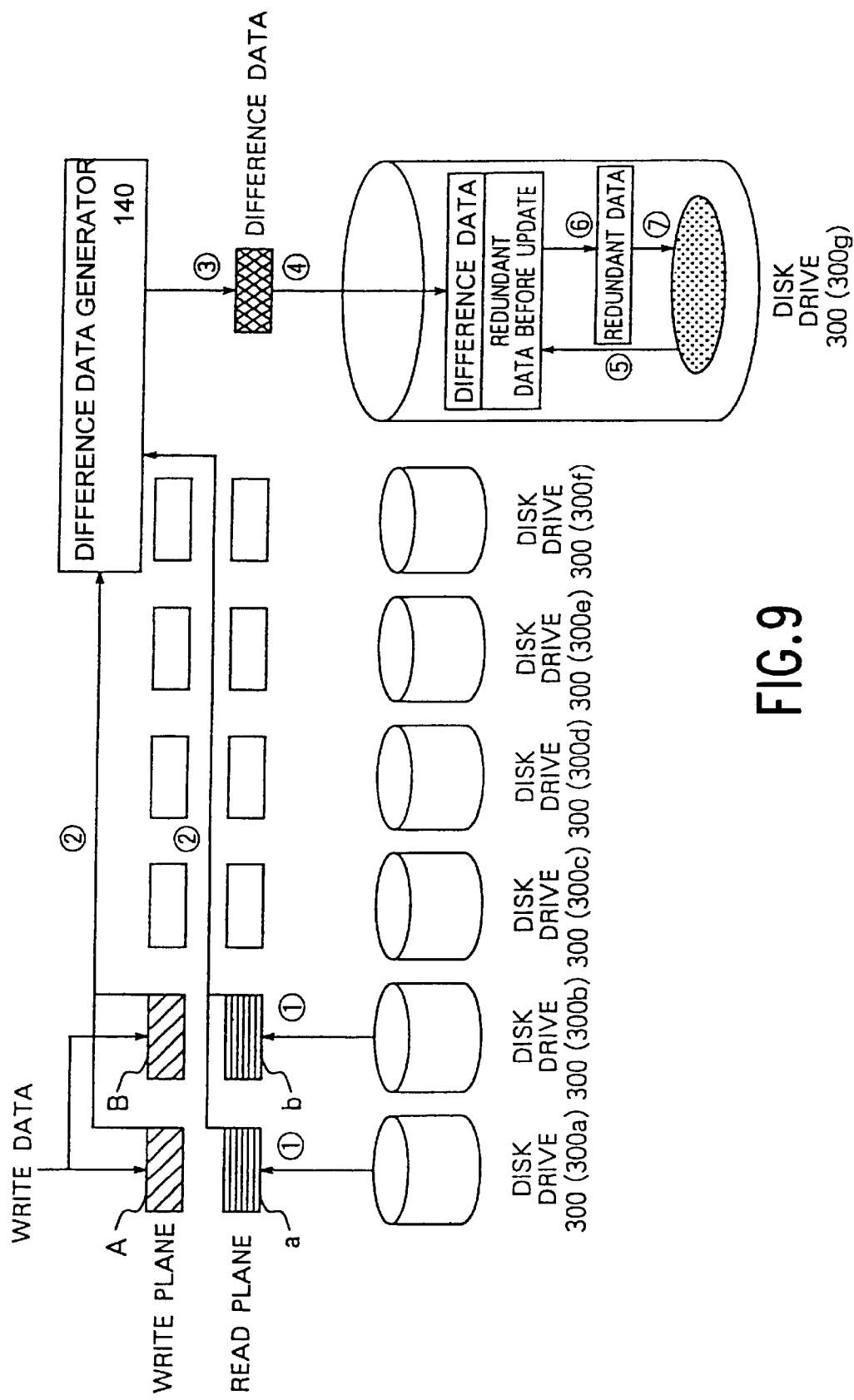
FIG. 9 is a diagram showing the flow of data during the generation of redundant data according to the "method of difference" in a disk array device according to an embodiment of the present invention.

If the conditional (2) above is not satisfied (the "no" branch is taken in step 1090), the operation goes to a step 1140. At this step, the redundant data generating method selecting module 37 is executed to select the "method of difference" as the method for generating the redundant data. The flow of the process is shown in FIG. 9. The difference data generator control module 35 (FIG. 1) is executed to transfer the write data in write plane 111 (FIG. 1), together with the existing disk data in the read plane 112, into the difference data generator 140 (see operation (2) of FIG. 9) for generating the difference data and saving it on the read plane 112 (see operation (3) of FIG. 9) of the cache memory 110 (FIG. 1).

One preferred method of calculating redundant data by the "method of difference" is to perform an exclusive OR operation between the write data and the read data. As illustrated in FIG. 9, the combination of data A and B, located on write plane 111 (FIG. 1) is exclusive ORed with the combination of data a and b on the corresponding read plane 112 (FIG. 1).

Next, the drive controller control module 36 (FIG. 1) is executed to transfer the difference data from the read plane 112 of the cache memory 110 (FIG. 1) to the redundant data disk drive 300 (300g) through the use of the plurality of drive controllers 50 (see operation (4) of FIG. 9). The difference data transferred to the disk control device 20 (FIG. 1) is then transferred to the drive buffer 330 (FIG. 2) through the disk I/F 310 (FIG. 2). At the same time, the microprocessor 320 located inside of the disk drive 300 operates to position the head at the position where the "redundant data before update" will be saved through the disk control mechanism 340 (FIG. 2). When the positioning operation is terminated, the microprocessor 320 operates to read the "redundant data before update" (see (5) of FIG. 9) and calculate an exclusive OR of the "redundant data before update" to be read and the difference data saved in the drive buffer 330 for generating the redundant data (see (6) of FIG. 9) and saving it in the drive buffer 330. When the disk medium 350 (FIG. 2) spins once and reaches the positioning point, the microprocessor 320 operates to write the redundant data saved in the drive buffer 330 on the disk medium 350. If the write of the redundant data is successful, the disk drive reports normal termination to the disk control device 20 (FIG. 1).

Finally, after the microprocessor 30 (FIG. 1) located inside of the disk control device 20 determines at step 1110 that the generation of the redundant data is successful, the operation goes to a step 1120, where the write data is written in the disk drive 300. Then, proceeding to a step 1130, the entire writing operation is terminated.

The disk array device and the method for controlling the disk array device according to this embodiment are controlled to select the most approximate method for generating the redundant data from the "method of all stripes" and the "method of read and modify," both of which are executed to generate the redundant data on the disk control device 20 according to the length of the write data received from the host 10, the access pattern such as sequential accesses, whether or not redundant data is in use (that is, the magnitude of load) in the disk drive 300, and whether or not a failure has taken place while generating and saving the redundant data, as well as the method of "generation in a drive" and the "method of difference," both of which are executed to generate the redundant data on the disk drive 300. Hence, the disk array device and the control method thereof make it possible to reduce the overhead accompanied with the generation of the redundant data in processing disk write data, improve response time and throughput of the disk array device in the process of writing the data, and enhance the reliability of generation of the redundant data.

The foregoing description has been specifically expressed according to preferred embodiments of the invention. However, it goes without saying that the present invention is not limited to the foregoing embodiments. It will be appreciated that modifications and variations of the present invention are covered by the above teachings and are within the purview of the appended claims without departing from the spirit and intended scope of the invention.

For example, the present invention may fully apply to a magnetic disk device provided with a magnetic disk medium as well as a disk array device providing as a storage unit a disk drive having a general rotary storage medium such as an optical disk unit or a magneto-optical disk unit.

The disk array device and method according to the invention provides the benefit of avoiding the spinning on standby caused when the data length of the write data sent by the host system is longer than one spin of the disk medium and thereby improves response time when the redundant data is generated by the disk drive composing a disk array.

The disk array device and method according to the invention provides the benefit of selecting the most approximate redundant data generating method that makes the necessary number of reads of the data before update minimal according to the divisional number of the write data received from the host system and thereby improving a throughput of the disk array device.

The disk array device and method according to the invention provides the benefit of reducing an occupation time for one spin of the disk drive when the redundant data is generated by the disk drive composing the disk array and thereby improving the response time of the disk array device.

The disk array device and method according to the invention provides the benefit of enhancing the efficiency of generating redundant data accompanied with the processing of write data according to the access pattern requested from the high level device, thereby improving the throughput of the disk array device.

The disk array device and method according to the invention provides the benefit of enhancing the reliability of generating redundant data by generating the redundant data in the disk drive composing the disk array.

What is claimed:

1. A disk array apparatus for storing data used for a higher level device, comprising:
    a plurality of disk drives for storing write data from said higher level device and storing redundant data used for the data of a data group to which the write data from said higher level device belongs;
    a disk control device for transferring the write data between said higher level device and one of said disk drives;
    a redundant data generating circuit present in said disk control device, for generating new redundant data from either (1) the write data from said higher level device, old data to be updated by the write data, and redundant data of the data group to which the write data belongs, or (2) the write data from said higher level device and data not to be updated by the write data of the data group to which the write data belongs; and
    a processor present in said disk control device, for selecting an operation of said redundant data generator in accordance with an access mode indicated by said higher level device.

2. A disk array apparatus according to claim 1 wherein said access mode defines whether or not said higher level device indicates a sequential access.

3. A disk array apparatus according to claim 2 wherein said processor compares a number of access times to said disk drives needed for a case where (1) the new redundant data is generated from the write data from said higher level device, the old data to be updated by the write data, and the redundant data of the data group to which the write data belongs, and for a case where (2) the new redundant data is generated from the write data from said higher level device and the data not to be updated by the write data of the data group to which the write data belongs, said processor thereby selecting the manner of operation of said second redundant data generating circuit.

4. A disk array apparatus for storing data used for a higher level device, comprising:
    a plurality of disk drives for storing write data from said higher level device and storing redundant data used for the write data;
    a disk control device for transferring the write data between said higher level device and said disk drives;
    a difference data generating circuit present in said disk control device, for generating difference data from the write data from said higher level device and old data to be updated by the write data;
    a first redundant data generator, present in each of said disk drives, for carrying out an operation to generate new redundant data from either (1) the difference data and old redundant data, or (2) the write data from said higher level device, the old data to be updated by the write data, and the old redundant data; and
    a processor present in said disk control device, for selecting the operation of said first redundant data generator to generate the new redundant data from either (1) the difference data and the old redundant data, or (2) the write data from said higher level device, the old data to be updated by the write data, and the old redundant data.

5. A disk array apparatus according to claim 4 wherein said processor selects the operation to generate the new redundant data in accordance with a relationship between a length of the write data from said higher level device and a length of data per one revolution of one of said disk drives for storing the write data.

6. A disk array apparatus according to claim 5, further comprising:
- a second redundant data generator present in said disk control device, for generating the redundant data, wherein said processor selects said second redundant data generating circuit to generate the redundant data when said one of said disk drives is busy, while said processor selects said first redundant data generating circuit when said one of said disk drives is not busy.

7. A disk array apparatus according to claim 6 wherein said second redundant data generator carries out the operation to generate the new redundant data from either (1) the write data from said higher level device, the old data to be updated by the write data and the redundant data of the data group to which the write data belongs, or (2) the write data from said higher level device and the data not to be updated by the write data of the data group to which the write data belongs; and wherein
- said processor compares a number of access times to said disk drives needed for a case where (1) the new redundant data is generated from the write data from said higher level device, the old data to be updated by the write data, and the redundant data of the data group to which the write data belongs, and for a case where (2) the new redundant data is generated from the write data from said higher level device and the data not to be updated by the write data of the data group to which the write data belongs, said processor selecting the manner of operation of said second redundant data generating circuit.

8. A disk array apparatus, comprising:
- a plurality of disk drives for storing write data from a higher level device and storing redundant data used for the write data;
- a disk control device for transferring the write data between said higher level device and said disk drives;
- a difference data generating circuit present in said disk control device, for generating difference data from the write data from said higher level device and old data to be updated by the write data in one of said disk drives;
- a first redundant data generator present in said disk drive for storing the redundant data, for carrying out an operation to generate new redundant data from either (1) the difference data and old redundant data, or (2) the write data from said higher level device, the old data to be updated by the write data, and the old redundant data;
- a second redundant data generator present in said disk control device, for carrying out an operation to generate the new redundant data from either (1) the write data from said higher level device, the old data to be updated by the write data and the redundant data of the data group to which the write data belongs, or (2) the write data from said higher level device and the data not to be updated by the write data of a data group to which the write data belongs; and
- a processor present in said disk control device, for controlling the operations of said first redundant data generating circuit and said second redundant data generating circuit.

9. A disk array apparatus according to claim 8 wherein said processor controls the operations of said first redundant data generator and said second redundant data generator such that a processing time of the write data including the redundant data is minimized.

10. A disk array apparatus for storing data used for a higher level device, comprising:
- a plurality of disk drives for storing write data from said higher level device and storing redundant data used for the write data;
- a disk control device for transferring the write data between said higher level device and said disk drives;
- a first redundant data generator present in said disk control device, for generating the redundant data;
- a second redundant data generator, present in one of said disk drives for storing the redundant data, for generating redundant data used for the write data; and
- a processor present in said disk control device, for selecting one of said first and second redundant data generating circuits, wherein said processor selects one of said first and second redundant data generators when required to generate redundant data.

11. A disk array apparatus according to claim 10 wherein said first and second redundant data generating circuits have input thereto data comprising either (1) the write data from said higher level device, old data to be updated by the write data and the redundant data of a data group to which the write data belongs, or (2) the write data from said higher level device and the data not to be updated by write data of the data group to which the write data belongs.

12. A disk array apparatus according to claim 11 wherein said first and second redundant data generating circuits generate the redundant data in response to the write data from said higher level device input thereto.

* * * * *

UNITED STATES PATENT AND TRADEMARK OFFICE
CERTIFICATE OF CORRECTION

PATENT NO.      : 6,463,505 B2
DATED           : October 8, 2002
INVENTOR(S)     : Eiju Katsuragi et al.

It is certified that error appears in the above-identified patent and that said Letters Patent is hereby corrected as shown below:

<u>Title page,</u>
Item [56], References Cited, OTHER PUBLICATIONS, change "Redunant Arays" to -- Redundant Arrays --.

<u>Column 1,</u>
Lines 10-13, delete the sentence starting with "This application is based on … by reference."

<u>Column 2,</u>
Line 5, after "partitions" insert -- . --.

Signed and Sealed this

Tenth Day of June, 2003

JAMES E. ROGAN
*Director of the United States Patent and Trademark Office*